United States Patent [19]

Sakaguchi

[11] 4,368,647
[45] Jan. 18, 1983

[54] RECIPROCATING DRIVING DEVICE

[75] Inventor: Hirofumi Sakaguchi, Hachioji, Japan

[73] Assignee: Konishiroku Photo Industry Co., Ltd., Tokyo, Japan

[21] Appl. No.: 169,148

[22] Filed: Jul. 15, 1980

[30] Foreign Application Priority Data

Jul. 27, 1979 [JP] Japan .................................. 54-94923

[51] Int. Cl.³ ...................... F16H 19/06; F16H 35/12
[52] U.S. Cl. ..................................... 74/89.22; 474/64
[58] Field of Search ................... 474/132–138, 474/64–68; 74/89.2, 89.21, 89.22

[56] References Cited

U.S. PATENT DOCUMENTS

| 145,908 | 12/1873 | Sellers | 474/113 |
|---|---|---|---|
| 1,062,385 | 5/1913 | Campbell | 74/89.22 |
| 1,667,117 | 4/1928 | Ireland | 474/132 |
| 2,639,623 | 5/1953 | Ausherman | 474/134 |
| 3,630,096 | 12/1971 | Brewer | 474/137 |
| 3,872,960 | 3/1975 | Gabor | 74/89.22 |
| 4,281,557 | 8/1981 | Ohta et al. | 74/89.22 |

FOREIGN PATENT DOCUMENTS 409492  4/1910  France ............................. 474/134

OTHER PUBLICATIONS

Shuman, "Compensating Idler System, etc." IBM Tech. Disclosure Bulletin, vol. 17, No. 5, p. 1415, Oct. 1974.

Primary Examiner—Lawrence J. Staar
Attorney, Agent, or Firm—Linda Bierman; Jordan B. Bierman

[57] ABSTRACT

A shock absorbed device for reciprocating a driven member includes a bidirectionally rotatable driving pulley, a pair of fixed pulleys between which the driven member is disposed, an oscillating pulley arranged between the driving and fixed pulleys, and at least a wire connecting all said pulleys. The oscillating pulley is mounted for free movement along a path from a neutral position centrally within its path in response to rotation of the driving pulley in either direction thereof.

4 Claims, 6 Drawing Figures

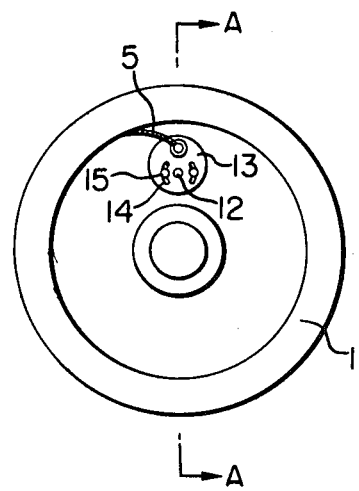
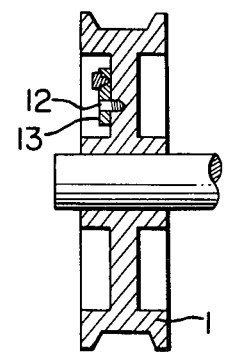
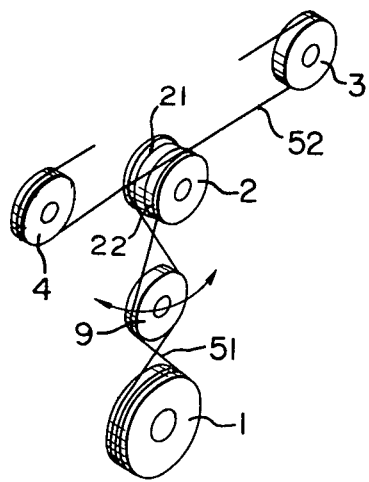
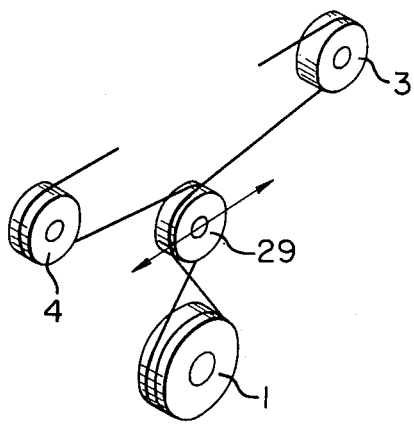

RECIPROCATING DRIVING DEVICE

BACKGROUND OF THE INVENTION

1. Field of the Invention

The present invention relates to a device for reciprocating an object by a driving means such as wire or the like, and particularly where movement at a constant speed is required. The invention is more specifically directed to an improvement in a reciprocating driving device having a shock absorbing feature for absorbing wire vibration caused by the initial shock at the start of motive action, and is of particular use in a copying machine such as an electrophotographic reproducing apparatus.

2. Description of the Prior Art

In a copying machine, a copy board (in a moving copy board type machine) or an optical member such as mirrors (in a moving optical system type machine) is driven by the revolving torque of a motor or direct coupled clutch through a power transitting means of wire or the like. This arrangement, however, results in one relatively tight and one relative loose wire portion being produced on respectively opposite sides of the driving pulley.

Furthermore, when the driving direction is reversed, the loose side of the wire suddenly becomes tight, while the tight side is correspondingly loosened. The inertia of the driven object, however, prevents it from quickly responding to the sudden change in driving direction initiated by the motor or clutch, and the energy generated by the shock at the initiation of such reversal is temporarily stored in the wire, causing it to vibrate. This vibration results in noticeable deterioration of the copied image being produced.

In an effort to absorb the initial vibration of the wire, it has been known to furnish a tensioner utilizing a spring or the like. This arrangement does not, however, provide a satisfactory countermeasure because vibration is produced not only at the initiation of motive action but additionally in constant speed motion due to the lesser tensile force of the tensioner as compared with the tensile strength of the wire.

Recently, a device has been utilized wherein two pulleys are provided on an oscillating member or bracket to which a friction member applies a braking force or motion resistance. Each of the pulleys is coupled under pressure to wires on both the tight and loose sides thereof; the impulse or shock of switching the tight side of the wire to the loose side—and vice versa—is to be absorbed by the frictional resistance produced during oscillation of the oscillating member (as, for example, disclosed in Japanese Laid Open Patent Publication No. 118,058/1978.) This arrangement, however, results in increased costs due to the requirement for two or more pulleys.

Moreover, if a wire is used as the driving means, some means for adjusting the tensile force of the wire is needed. Should such adjustment be attempted by adjusting the pressure forces coupling the two pulleys, the structure of the oscillating member becomes substantially more complex.

SUMMARY OF THE INVENTION

An object of the present invention is to provide a device by which the foregoing deficiencies are eliminated by improving an oscillating pulley.

The above object, novel features and advantages of the present invention will become more apparent from the following detailed description of preferred embodiments thereof taken in conjunction with the accompanying drawings.

BRIEF DESCRIPTION OF THE DRAWINGS

FIG. 3 is an elevated face view of a tensile force adjusting device for a wire engaged with a drum shaft pulley;

FIG. 4 is a sectional view taken along the line A—A in FIG. 3; and

FIGS. 5 and 6 are semi-schematic, elevated perspective views of alternate embodiments constructed in accordance with the invention.

DETAILED DESCRIPTION OF THE PREFERRED EMBODIMENTS

Figure 1:
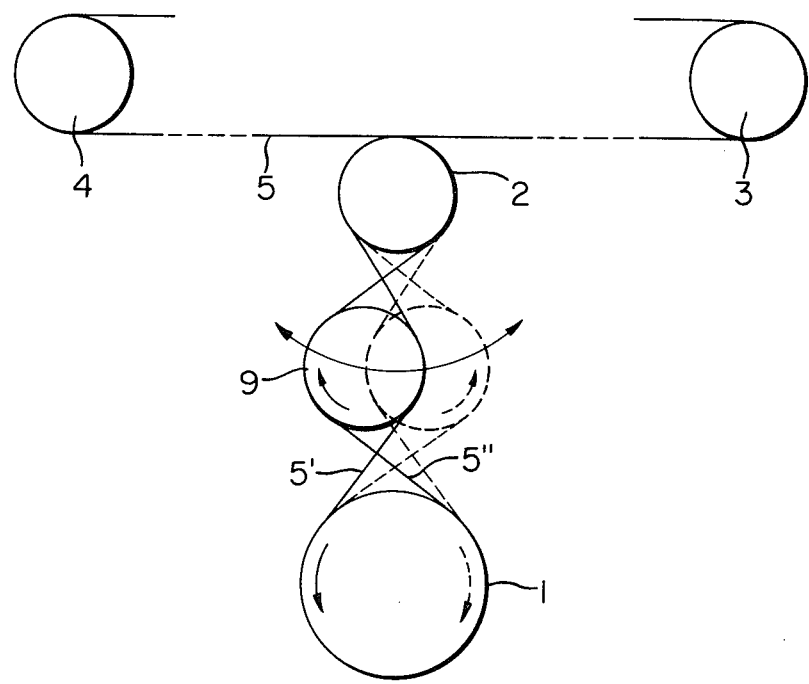
FIG. 1 is a diagrammatic illustration of an apparatus constructed in accordance with the teachings of the present invention.

FIG. 1 is a schematic or diagrammatic illustration of one embodiment of an improved wire driving mechanism, wherein reference numeral 1 denotes a rotatable drum shaft pulley provided on a shaft (not shown) for a photosensitive drum driven by a motor and associated clutch (not shown). A rotatable main pulley 2 is provided for driving the object to be moved—such as an optical system or a copy board for carrying an original to be copied—pulley 2 being stationarily mounted or fixed to the body of the copying machine (not shown). Rotatable pulleys 3 and 4 are similarly fixed to the copying machine body. All of these pulleys 1, 2, 3 and 4 are connected by a wire 5 to provide for reciprocating motion of the object to be driven in response to bidirectional revolution of drum shaft pulley 1. Although the driven object is not shown in FIG. 1, it should be understood as being connected to the two ends of wire 5 which are seen at the top of the Figure.

Figure 2:
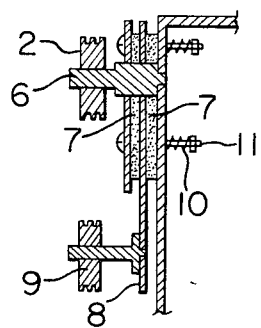
FIG. 2 is a sectional view of the shock absorbing device of the invention.

In the present invention, as further seen in FIG. 2, an oscillating pulley 9 is disposed for freewheeling rotation about the shaft 6 of main pulley 2. More particularly, oscillating pulley 9 is mounted for free rotation on one end of an oscillating plate 8, the opposite end of which is pivotable about shaft 6 with a friction member 7 applying a braking resistance to such pivotability. Oscillating pulley 9 is further located or arranged midway between drum shaft pulley 1 and main pulley 2. Wire 5 is suspended alternately left and right along the aligned pulleys; i.e. from the right side of drum shaft pulley 1 to the left side of oscillating pulley 9, and then to the right side of main pulley 2. In FIG. 2, reference numerals 10 and 11 designate a spring and a bolt and nut, respectively, for adjusting the braking force applied to oscillating plate 8.

With this construction, when drum shaft pulley 1 revolves in the direction of the solid-line arrow (FIG. 1), the left side 5' of wire 5 is the tight side, and oscillating pulley 9 is swung along its path of motion, from a neutral or rest position centrally within the path, to the left by the tensile force of wire 5'. When the revolving direction of drum shaft pulley 1 is subsequently reversed so as to the revolve in the direction of the dotted-line arrow in FIG. 1, the right side wire portion 5" becomes the tight side and the wire portion 5' on the left side is correspondingly loosened. Oscillating pulley 9 is therefore swung to the right side of its path together with oscillating plate 8 while receiving braking resistance from the tensile force of right side wire portion 5" and friction member 7. This resistance places a load on drum shaft pulley 1 from the initiation or starting instant of motive action, and the difference between the motive action characteristics of drum shaft pulley 1 and those of the driven member is decreased as the energy of vibration is absorbed by friction; at the same time, the looseness of the wire on the looser side is absorbed by the movement of oscillating pulley 9 which is prepared for subsequent switching over to the opposite direction of rotation. Thus, the shock absorbing device of the present invention provides the ability to effectively absorb both the energy of the shock produced when motive action starts and the looseness of the wire, while making use of only a single oscillating pulley.

The earlier mentioned, prior art device having two oscillating pulleys enables adjustment of the tensile force of the wire by varying the distance between its two pulleys. However, when such a device includes only one oscillating pulley—as does the present invention—no such ability is provided. In the present invention, it has been recognized as unnecessary that the tensile force adjustment function jointly with the shock absorbing device; an adjusting arrangement can instead by provided on drum shaft pulley 1 or at the end of wire 5 which is attached to the copying machine body. FIGS. 3 and 4 illustrate an example of a tensile force adjustment device located where the wire is attached to drum shaft pulley 1.

Referring now to FIGS. 3 and 4, the side surface or face of pulley 1 carries a metal wire attaching fixture 13 mounted so that fixture 13 is pivotally movable about an eccentric shaft 12, one end of wire 5 being secured to fixture 13. Reference numeral 14 designates a circular arc slot centered, in this embodiment, at the horizontal plane of the eccentric shaft, and numeral 15 designates a fixing screw. The tensile force adjustment may be performed by loosening screw 15, pivotally rotating fixture 13 about its shaft 12 until wire 5 is given a suitable tensile force, and then locking the adjustment by tightening fixing screw 15.

In the embodiment of the invention shown in FIG. 5, main pulley 2 is seen to comprise a pair of coaxially arranged pulleys 21, 22. A driven wire 52 is connected to both the driven member and pulley 22, while a separate, driving wire 51 connects pulleys 1, 9 and 21. Thus, when the driving wire system (which includes wire 51, drum shaft pulley 1, oscillating pulley 9, and main pulley 21) and the driven wire system (consisting of wire 52, main pulley 22, pulleys 3 and 43, and the driven member) are separately constituted in this manner, the driving wire 51 receives the bulk of the motive shock initiated by driving or drum shaft pulley 1, so that the shock absorbing device may be furnished to the driving wire system. Should looseness exist in driving wire 51, there will be no influence or affect on the driven wire system and also no danger as of positional deviations of the optical system or copy board. This has the further affect of decreasing the need for tensile force adjustment of the driving wire 51. It will, of course, be recognized that oscillating pulley is once again arranged for movement—from side to side—in the manner described in connection with the embodiment of FIG. 1.

In the embodiment shown in FIG. 6, as in that of FIG. 1, the wire (no reference numeral) is arranged as a single run or piece of wire for both the driving and driven portions of the system. In this particular construction, the function of the oscillating pulley is borne by the main pulley 29 which is mounted on the oscillating plate 8 for freely pivotable, side-to-side movement. The FIG. 6 arrangement thereby provides satisfactory shock absorbing affects in a notably simplified structure.

In each of the foregoing embodiments, all of the pulleys are aligned—at assembly—in a straight line at the central or neutral position of the oscillating pulley. However, this alignment can be freely changed. Furthermore, in each of the embodiments, pulleys 9 and 29 are mounted on an oscillating plate for movement from side to side.

The present invention accordingly provides an extremely simplified structure for a shock absorbing device of a reciprocating driving system, wherein a sharply curved portion is formed in a part of the wire—as, for example, at the left side of the pulley shown in solid line in FIG. 1. Movement of the apex of said curved portion which is produced when the curved portion is elongated by the tensile force is braked by a friction member, and the shock generated at the start of motive action to the left from the right side or in otherwise reversing the rotational direction of the pulley is absorbed by the braking friction while the looseness of the looser side of the wire is absorbed by sharpening the curve formed by the relative length of the wire with the oscillating pulley. At the same time, the movement of the apex of the curved portion is prepared for subsequently being switching over to the next revolving direction. Thus, the structure of said curved portion of the wire is implemented by engaging the wire on alternately left and right sides of the driving pulley and the oscillating pulley, and by utilizing only one oscillating pulley.

Furthermore, while the present disclosure describes the oscillating plate as being pivotably or rotatably movable, such design changes are possible so that the oscillating plate is horizontally slidable along a straight line, and so that the tensile force adjusting device is attached to the wire at its connection or attachment to the copying machine body.

I claim:
1. A driving device for reciprocating a driven member in a copying machine and for minimizing operative vibration as reciprocation of the driven member is initiated, said driving device comprising:
a bidirectionally rotatable driving pulley;
at least two fixed pulleys mounted in spaced apart relation on the copying machine;
an oscillating pulley;
wire means guided about alternating radially opposite sides of said driving pulley, said oscillating pulley and said fixed pulleys, and connected to the driven member between said fixed pulleys;
an oscillating plate for supporting said oscillating pulley between said driving pulley and said fixed pulleys, said oscillating plate being substantially freely movable to carry said oscillating pulley along a path from a neutral position centrally within said path in response to rotation of said driving pulley in either direction thereof; and
a friction member for applying a frictional force to said freely movable oscillating plate in either direction of driving pulley rotation to damp movement of said oscillating plate as reciprocation of the driven member is initiated.

2. A driving device in accordance with claim 1, further comprising a tensile force adjustment device for adjusting the tensile force of said wire means.

3. A driving device in accordance with claim 1, further comprising a main pulley disposed between said oscillating pulley and said fixed pulleys.

4. A driving device in accordance with claim 2, said tensile force adjustment device including a fixture eccentrically pivotally mounted on said driving pulley and having an end of said wire means fixed thereto, and means for selectively fixing the pivotal position of said fixture with respect to said driving pulley so as to predeterminately adjust the tensile force of said wire means.

* * * * *